Jan. 11, 1955  O. KOELLE  2,699,378
REACTION CONTAINERS
Filed April 28, 1951

INVENTOR
*OTTO KOELLE*

BY Burgess & Dinklage

ATTORNEY

United States Patent Office 2,699,378
Patented Jan. 11, 1955

2,699,378

REACTION CONTAINERS

Otto Koelle, Melsungen, Hessia, Germany, assignor to Bronwill Scientific, Inc., a corporation of New York Application April 28, 1951, Serial No. 223,600

Claims priority, application Germany July 12, 1950

4 Claims. (Cl. 23—252)

The present invention relates to reaction containers.

In the manometric measurement of gas change with the assistance of Warburg-apparatus hitherto reaction vessels have been employed which have been so constructed that by inclining the vessel two liquids separated from each other can flow together and thus react with one another. As the manometer, with which the progress of the reaction or of the gas change has been observed has been rigidly connected with this reaction vessel, this inclination could only be dealt with if the whole system of the manometer and the reaction container was taken sufficiently far out of the thermostat bath to give a sufficient freedom of movement. In such a case it was difficult to avoid the reaction vessel or its gaseous contents being exposed to changes in temperature which had a disturbing influence on the indications of the manometer. After the reinsertion of the system in the thermostat bath a time of about 10 to 15 minutes has been necessary for the restoration of the previous conditions of temperature. For various reactions however the important part of their period measures such a short time and starts in direct connection with the flowing together of the liquids that technically measurable prosecution of the reaction, which is only possible in a manner free from objection after the lapse of ten to fifteen minutes on the above-mentioned grounds is excluded.

Various reactions which bring together both liquids without the reaction vessel having to be taken out of the temperature bath have other disadvantages as regards exact measurement. Thus for example a reaction vessel may be constructed wherein one of the two liquids is contained in an additional member which is suspended from and is in smooth rotatable connection with the main space chamber of the reaction vessel. On rotation of the additional member this liquid is allowed to flow into the chamber containing the main space. Rotation could be effected in the thermostat bath. Apart from the disturbance of the equilibrium of temperature owing to contact of the reaction vessel with the hand, a specially disadvantageous consequence arises in the impossibility of being able to rinse out the smooth additional vessel with the mixture, so that only part of the liquids come together for reaction, whilst there is a small residual quantity which cannot take part in the reaction remaining in the additional vessel as an unmixed fluid film.

The object of the present invention is to provide a reaction vessel in which the above described disadvantages are not present.

The invention chiefly consists in the provision of a vessel which can be closed and which contains a small vessel with an aperture, the vessel being made of a magnetic material or of any other material but provided with a magnetic core preferably molten to its surface or inside the wall of this smaller vessel. The larger vessel must be made of non-magnetic material. As a rule both vessels are made of glass or transparent artificial material as e. g. synthetic resins. The vessels may also be made of china. It is also possible to make the larger vessel of materials which have no appreciable magnetic properties, e. g. brass, aluminium, copper or lead.

As magnetic materials the well known may be used such as nickel, preferably iron. The small vessel which is magnetic is held in upright position in relation to the larger vessel by means of a magnet outside the larger vessel. Preferably this magnet may be moved along guiding means connected in a suitable way with the larger vessel. It is of course also possible to provide more than one smaller vessel.

Generally speaking the invention consists in a method of moving smaller vessels in larger vessels by means of a magnet on the one hand and by making the smaller vessel magnetic. As magnets electro- or permanent-magnets may be used, preferably a permanent magnet consisting of an alloy of aluminium and nickel.

The aim of the invention is to provide a possibility of mixing two or more liquids contained separately within another, preferably closed vessel at will, e. g. to react the liquids upon each other without changing the position of the larger vessel and without complicated devices for moving the smaller vessel.

As examples for using the new device the quantitative and qualitative control of chemical, physical, biological, physiological, histological, bacteriological processes may be mentioned. More especially e. g. the quantitative and qualitative determination of $CO_2$, $O_2$, $N_2$, $NH_3$ may be mentioned as well as sulfonation and nitration.

The invention is of special value in cases where the course of the reaction is to be observed by means of the development of gas or heat or by means of photochemical phenomenas. Just by way of example the monometric technics of Warburg especially in the research of fermentation may be mentioned.

The accompanying drawings illustrate by way of example merely one embodiment of a reaction vessel made in accordance with the present invention.

Figure 1:
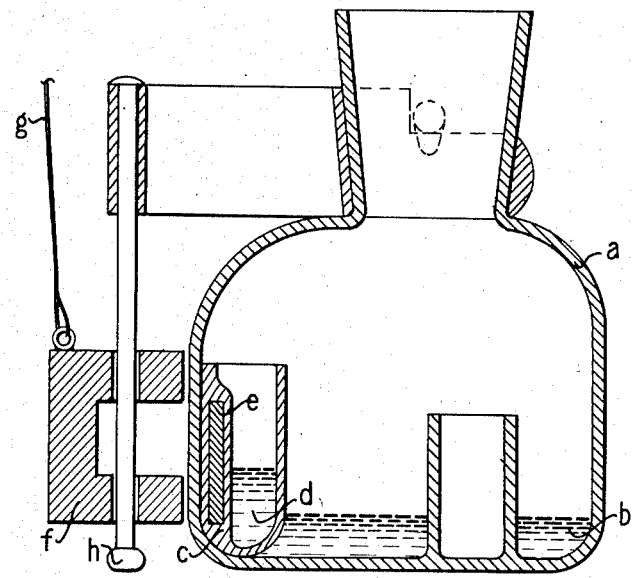
Fig. 1 is a sectional elevation of the embodiment.
Figure 2:
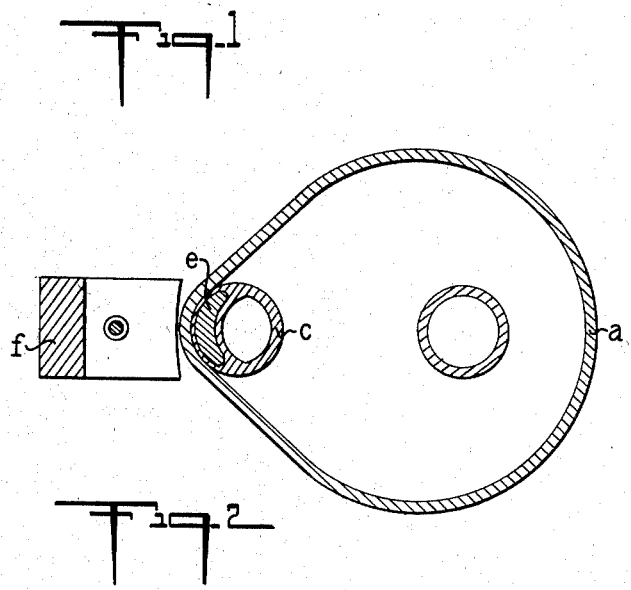
Fig. 2 is a horizontal section on line II—II in Fig. 1.

In a suitably constructed reaction vessel $a$ containing a liquid $b$ to be reacted there is movably arranged a small glass container $c$ formed like a test-tube. This container $c$ contains another liquid $d$ to be reacted and is introduced through the neck of the vessel $a$ by means of small pincers, not shown. In the side of the glass container $c$ an iron core $e$ is inserted by casting the molten glass around the core during manufacture of the container $c$. The container $c$ can be held in an upright position against the wall of the vessel $a$ by means of the attraction effected on the iron core $e$ by a permanent magnet $f$ which is slidably disposed on a guide $h$ secured to an arm attached to the neck of the reaction vessel by means of a rotatable catch arrangement.

A string $g$ is attached to the magnet $f$ for the purpose of raising and lowering the magnet.

The reaction vessel may be provided with an additional chamber inside open to the interior of the vessel for the reception of an additional reagent if desired.

In operation in order to mix liquid for reaction, the magnet $f$ is drawn up on the guide $h$ by means of the string $g$ so that the container $c$ containing the liquid $d$ is drawn up so that it turns over and falls onto the bottom of the vessel $a$ and empties its contents $g$ to mix with the liquid $b$ in the vessel $a$. This procedure can be carried out whilst the reaction vessel $a$ is disposed in the thermostat bath and is shaken.

By using apparatus in accordance with the invention contact of the reaction vessel itself with the hand and consequent undesirable effect on the temperature of its gaseous contents is avoided.

Effective mixture of the two liquids can be carried out with consequent thoroughness of the reaction under conditions which can be directly followed manometrically.

Having now particularly described the nature of this invention, what is claimed is:

1. A reaction vessel comprising an outer container adapted to hold a reagent, said outer container having a side wall including a reduced portion, an open-top smaller container in upright position within said outer container below said reduced portion adapted to hold a different reagent, said smaller container having magnetic properties, said larger container being of non-magnetic material, a magnet positioned outside said outer container and adapted to attract said smaller container, said magnet being movable vertically to move said smaller container vertically against the side wall of said outer container, the reduced portion of said outer container causing said smaller container to turn from its upright position and spill its reagent from its open top to mix with the reagent of the outer container.

2. A reaction vessel comprising an outer container adapted to hold a reagent, at least one open-top smaller container in an upright position within said outer container adapted to hold a second reagent, said smaller container being vertically movable within said outer container, said outer container having a convergent wall portion in the path of vertical movement of said smaller container for inverting said smaller container while being moved vertically within said outer container to spill its reagent from its open top and mix with the reagent of the outer container and actuating means accessible externally of said outer container for imparting vertical movement to said smaller container.

3. A reaction vessel comprising an outer container adapted to hold a reagent, at least one open smaller container in upright position within said outer container adapted to hold a different reagent, said smaller container having magnetic properties, said larger container being of non-magnetic material, a magnet positioned outside said outer container and adapted to attract said smaller container, said magnet being movable vertically to move similarly said smaller container, and a curved wall provided by said larger container in the path of movement of said smaller container for causing said smaller container to turn on a horizontal axis while being moved vertically to spill its reagent to mix with the reagent of the outer container.

4. A reaction vessel according to claim 3, in which both the outer container and the smaller container are made of glass, said smaller container having a magnetic core.

References Cited in the file of this patent

UNITED STATES PATENTS

| | | |
|---|---|---|
| 2,129,502 | McCreary | Sept. 6, 1938 |
| 2,350,534 | Rosinger | June 6, 1944 |
| 2,383,377 | Evans et al. | Aug. 21, 1945 |
| 2,518,758 | Cook | Aug. 15, 1950 |

OTHER REFERENCES

Industrial and Engineering Chem., Anal. Ed., vol. 10; No. 11, page 638.

Industrial and Engineering Chem., Anal. Ed., vol. 11; No. 7, page 397.

Industrial and Engineering Chem., Anal. Ed., vol. 13; No. 9, page 655.

Industrial and Engineering Chem., Anal. Ed., vol. 14; No. 11, pages 907–8.

Industrial and Engineering Chem., Anal. Ed., vol. 18; No. 5, page 338.